(12) United States Patent
Geltinger et al.

(10) Patent No.: US 8,696,339 B2
(45) Date of Patent: Apr. 15, 2014

(54) BLOW MOULDING MACHINE WITH STERILE CHAMBER AND MEDIA FEED IN THE STERILE CHAMBER

(75) Inventors: Florian Geltinger, Donaustauf (DE); Michael Neubauer, Regensburg (DE)

(73) Assignee: Krones AG (DE)

( * ) Notice: Subject to any disclaimer, the term of this patent is extended or adjusted under 35 U.S.C. 154(b) by 175 days.

(21) Appl. No.: 13/399,697

(22) Filed: Feb. 17, 2012

(65) Prior Publication Data
US 2012/0225156 A1 Sep. 6, 2012

(30) Foreign Application Priority Data
Mar. 4, 2011 (DE) .......................... 10 2011 013 118

(51) Int. Cl.
B29C 49/36 (2006.01)
B29C 49/46 (2006.01)
B29C 49/56 (2006.01)
B29C 49/64 (2006.01)

(52) U.S. Cl.
USPC ............. 425/73; 425/522; 425/526; 425/540; 425/541

(58) Field of Classification Search
USPC ............................ 425/73, 522, 526, 540, 541
See application file for complete search history.

(56) References Cited

U.S. PATENT DOCUMENTS 6,442,976 B1 * 9/2002 Flynn ............................... 65/265
6,668,591 B2 * 12/2003 Flynn ............................... 65/265
2010/0272844 A1 10/2010 Dordoni ......................... 425/210
2011/0133369 A1 6/2011 Martini et al.
2012/0070340 A1 3/2012 Voth ................................ 422/28
2012/0070522 A1 3/2012 Voth et al. ....................... 425/88
2012/0070529 A1 3/2012 Rousseau et al. ............. 425/526

FOREIGN PATENT DOCUMENTS

| EP | 2246176 | 11/2010 | ............. B29C 49/46 |
| EP | 2388129 | 11/2011 | ............. B29C 49/46 |
| EP | 2431058 | 3/2012 | ............. A61L 2/18 |
| FR | 2945979 | 12/2010 | ............. B29C 49/48 |
| JP | 08282789 A | * 10/1996 | |
| WO | WO2010020529 | 2/2010 | ................ A61L 2/20 |

OTHER PUBLICATIONS

European Search Report issued for corresponding application No. 2158122.7, dated Jun. 25, 2012 (7 pgs).

* cited by examiner

Primary Examiner — Robert B Davis
(74) Attorney, Agent, or Firm — Hayes Soloway P.C.

(57) ABSTRACT

An apparatus for shaping plastics material preforms into plastics material containers, having a multiplicity of shaping stations arranged on a movable carrier. The shaping stations each comprise blow moulds, inside which the plastics material preforms can be shaped into plastics material containers by application of a free-flowing medium, as well as blow mould carriers for holding these blow moulds. The blow mould carriers comprise at least two blow moulding carrier parts movable in relation to one another to open and close the blow moulds, and having at least one fastening element, via which at least one element of the shaping stations is arranged on the carrier. A clean chamber surrounds the individual shaping stations, at least in part, so that the shaping stations are movable inside this clean chamber.

19 Claims, 4 Drawing Sheets

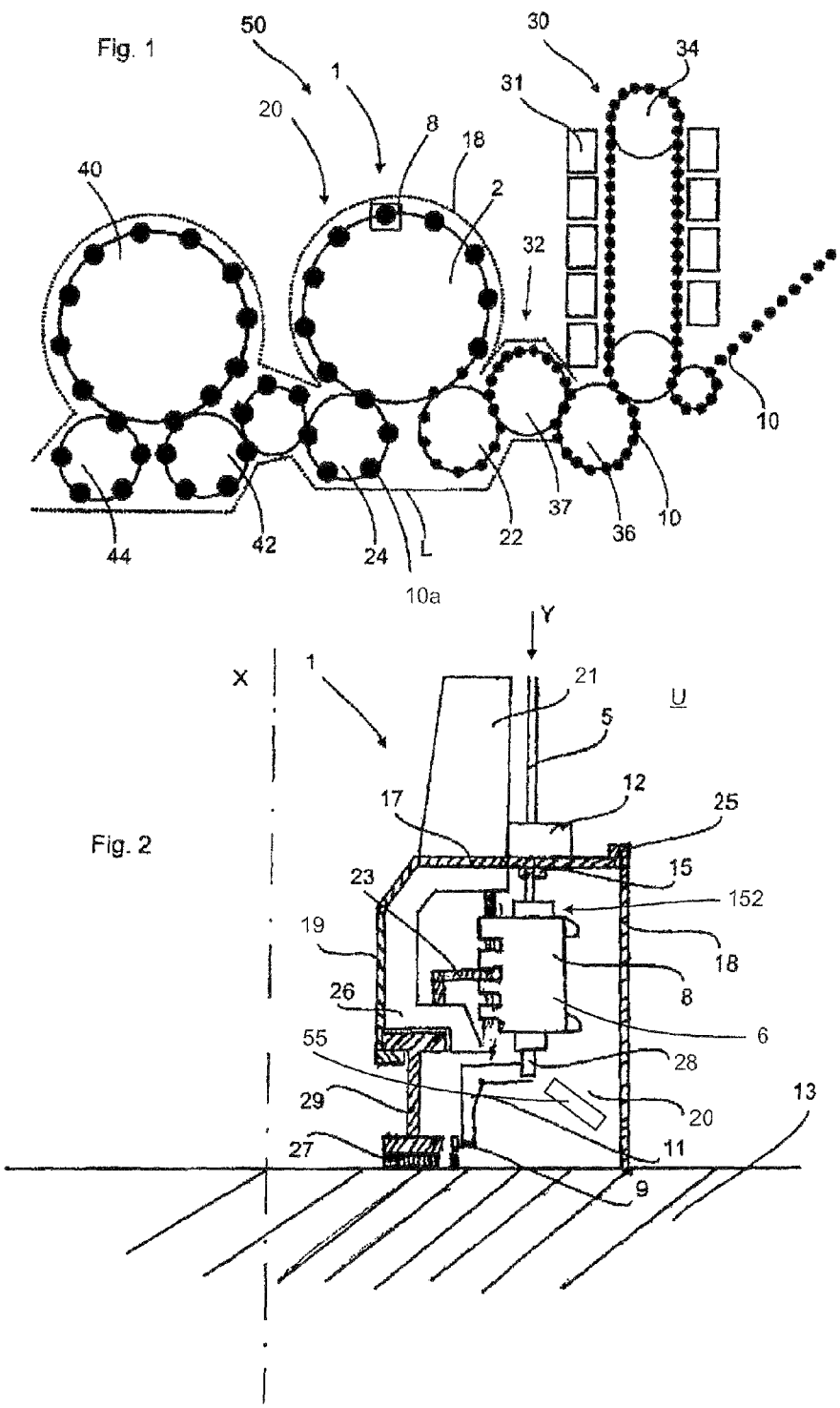

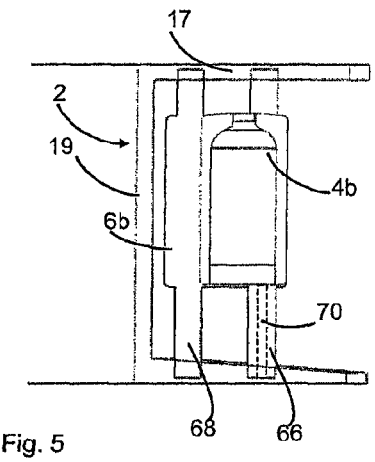
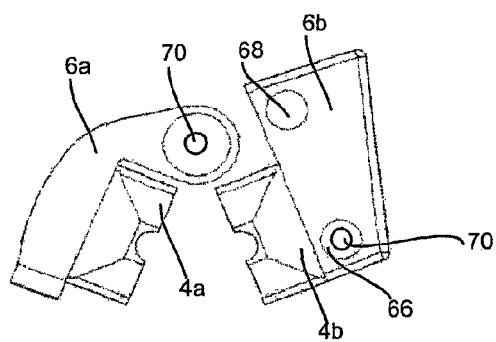
Fig. 5     Fig. 6
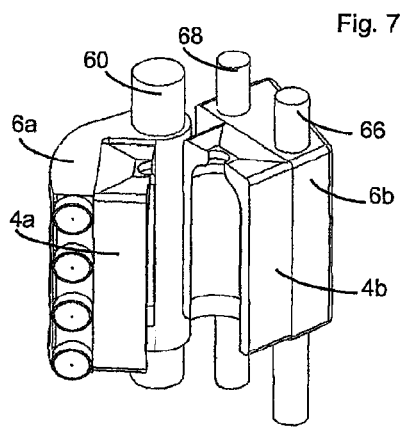
Fig. 7
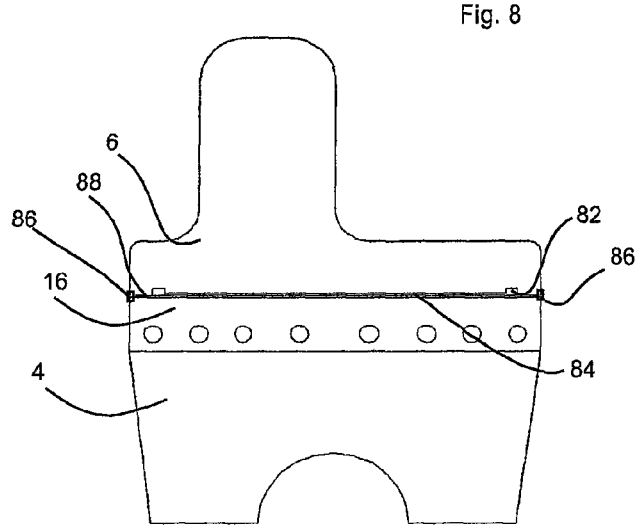
Fig. 8

BLOW MOULDING MACHINE WITH STERILE CHAMBER AND MEDIA FEED IN THE STERILE CHAMBER

BACKGROUND OF THE INVENTION

The present invention relates to an apparatus for shaping plastics material preforms into plastics material containers. Such apparatuses, in particular stretch-blow moulding machines, have long been known from the prior art. The containers are received by blow moulding stations and are expanded, for example by application of pressurised air, to form plastics material containers.

Furthermore, blow moulding machines which enable production of the plastics material containers under aseptic conditions are known from the prior art. For example, WO 2010020529 A2 describes a stretch blow moulding machine for beverage containers, in which the blow moulding procedure takes place in a sterile chamber. Any risk to hygiene which could lead to contamination, must be avoided in such sterile chambers. The subject matter of WO 2010020529 A2 is hereby fully incorporated by reference in the subject matter of the present application.

Such a blow moulding station generally consists of two mould carriers, which are movable in relation to one another and receive the actual blow moulds, possibly by means of carrier shells. These two blow mould carriers are movable in relation to one another so as to carry out an opening procedure for insertion of the plastics material preform and for removal of the finished, blown bottle.

It is further known that, for procedural reasons, the blow moulds are cooled, since they could otherwise be heated unduly by the introduced heat of the heated plastics material preforms.

Such blow moulding stations also preferably comprise a "pressure pad" on at least every mould carrier per blow moulding station. Pressurised air is applied to this pressure pad during the blow moulding procedure so as to compensate the deformation of the mould carrier owing to the internal pressure of up to 40 bar.

So as to perform these two functions, that is to say the cooling of the mould and the pressure pad, media such as cooling media and pressurised air are guided via hoses to the shaping stations or blow moulding stations in today's stretch-blow moulding machines.

Such hoses and also couplings represent a hygiene risk, however. On the one hand, such hose systems are difficult to clean and to sterilise under some circumstances. On the other hand, they prevent a neat and clean appearance of the clean chamber.

The object of the present invention is therefore to improve the sterilisation and maintenance of the sterilisation for such blow moulding machines.

SUMMARY OF THE INVENTION

An apparatus according to the invention for shaping plastics material preforms into plastics material containers comprises a multiplicity of shaping stations which are arranged on a movable carrier, wherein the shaping stations each comprise blow moulds, inside which the plastics material preforms can be shaped into plastics material containers by application of a free-flowing medium, as well as blow moulding carriers for holding these blow moulds, and wherein the blow mould carriers comprise at least two blow mould carrier parts, which are movable in relation to one another, for opening and closing the blow moulds, and wherein at least one fastening element is provided, via which at least one element of the shaping stations is arranged on the carrier. Furthermore, the apparatus comprises a clean chamber (also referred to hereinafter as a sterile chamber), which is defined (and preferably also sealed) with respect to a surrounding environment by means of at least one wall and surrounds the individual shaping stations, at least in part, so that the shaping stations are movable inside this clean chamber. One such fastening element is advantageously assigned to each shaping station. Futhermore, at least one feed line is provided, which feeds a free-flowing medium at least to one shaping station arranged in the sterile chamber for operation of said shaping station.

In accordance with the invention, this feed line for the free-flowing medium extends through a boundary of the clean chamber and the feed line is guided through the fastening element, at least over portions. A feed of the medium during operation is understood to mean that the free-flowing medium assists at least one sub-process of the shaping procedure. It would thus be possible for the feed line to be formed directly by the fastening element, for example in the form of a bore which is provided in the fastening element and serves as a duct for the free-flowing medium. However, it would also be possible for the feed line to be guided through the fastening element in the form of a hose for example.

In a further embodiment according to the invention the feed line for the free-flowing medium likewise extends through a boundary of the clean chamber and the feed line runs, at least over portions, inside an tubular member arranged in the clean chamber.

In both embodiments according to the invention it is therefore proposed that, in the clean chamber, the feed line runs inside a sterile or sterilisable member. It is thus possible for unhygienic media to also circulate, or else for one or more unhygienic hoses to run inside the tubular member for example. It is thus possible in these embodiments nevertheless to guide unsterile media inside the clean chamber. The media for operation of the shaping station is therefore preferably not the pressrised air which is used to shape the plastics material preforms, but is a medium which is used in another way for operation of the shaping station itself.

This aforementioned tubular member may extend for example from a boundary of the sterile chamber to a shaping station. It would also be possible for a multiplicity of such annular members to be arranged inside the clean chamber. However, it would also be possible for a reservoir or duct for example for the free-flowing medium to be arranged inside the clean chamber, from which reservoir or duct the individual shaping stations can be fed using a multiplicity of valves.

In a further alternative embodiment according to the invention it would also be possible to provide, inside the sterile chamber, a tubular member or a flexible corrugated hose through which a fluid can be transported from an unsterile surrounding environment into the clean chamber or to the mould carrier or the shaping stations. In this case it is thus advantageous if an outer wall of this corrugated hose or tubular member is formed in a sterile manner and, nevertheless, if an unsterile medium can be guided inside this hose. It is also possible for a portion of this hose to extend through the boundary of the sterile chamber and to preferably be sealed with respect to the boundary of the sterile chamber.

The free-flowing medium is advantageously under a pressure inside the feed line and advantageously also inside the clean chamber, said pressure (in particular during working operation) always being below 40 bar, preferably always below bar, more preferably always below 20 bar, and more preferably always below 10 bar.

It is therefore proposed in accordance with the invention, in particular in order to avoid hoses and the like, to form part of the feed line by such a fastening element, for example in the form of a duct which is guided through this fastening element. The free-flowing medium is a gaseous medium in particular, but could also be a liquid or else electrical current however. In this case the feed line would be an electrical line which serves e. g. as a current feed line or control line for electric motors. The carrier is advantageously a rotatable carrier or a blow moulding wheel, on which the individual shaping stations are arranged. The shaping stations are advantageously arranged on an outer periphery of this blow moulding wheel. The free-flowing medium for shaping the plastics material preforms is air in particular, more preferably sterile air.

In a further advantageous embodiment the clean chamber is formed in a duct-like manner around the shaping stations and the transport path thereof. As a result of the approach according to the invention, hose systems inside the clean chamber can be avoided or at least limited and formed hygienically.

The fastening element is advantageously a pivoting shaft, by means of which the blow mould carriers are movable in relation to one another. It would thus be possible for a hose connection to be guided inside this shaft, or for a duct for conveying the free-flowing medium to be arranged inside this shaft. However, it would also be possible for the feed line to be arranged in the carrier, which for example holds a blow mould carrier part which is immobile with respect to the carrier. The feed line preferable penetrates a cross-section of the pivoting shaft and thus extends inside the pivoting shaft. In a further advantageous embodiment the feed line runs parallel to a longitudinal direction of the pivoting shaft.

In a further advantageous embodiment the feed line comprises at least one flexible portion. In this way, pivoting movements for example, which are caused by the opening and closing of the blow moulds, can be compensated for, in particular if these hose connections are guided, at least over portions, through said pivoting shaft. The feed line is advantageously composed of a plurality of portions.

In a further advantageous embodiment the flexible portion is arranged completely inside the clean chamber or completely outside the clean chamber. Said flexible portion is particularly preferably arranged completely outside the clean chamber, so that the pivoting movement is compensated for in a hygienically uncritical region of the machine for example, that is to say in particular outside the clean chamber.

In a further advantageous embodiment at least one feed line is connected in terms of flow to at least one blow mould or to at least one blow mould carrier. For example, the feed line may thus be provided so as to actuate the above-mentioned pressure pad, or else so as to cool the blow mould. It would also be conceivable for the feed line to supply a valve block having control valves for example, so as to thus enable the valve control for the blow moulding procedure.

In a further advantageous embodiment the apparatus comprises at least one discharge line, which removes a free-flowing medium from the sterile chamber. For example, leakage media, which may be unsterile in particular, can thus be removed from the clean chamber. At least one of the above-described fastening elements advantageously also serves as a discharge line.

In a further advantageous embodiment, the feed line is sealed completely with respect to the clean chamber. It is thus possible, in the feed line, for an unsterile medium to also be guided inside the clean chamber.

At least one fastening element advantageously comprises a duct for conveying the medium. It would thus be possible for this duct to be formed inside the fastening element.

In a further advantageous embodiment the feed line extends through a wall formed by the carrier. For example, the carrier may thus comprise a c-shaped profile at its outer periphery, the upper branch of this c as well as the lower branch also each constituting walls of the sterile chamber. The most compact design possible of the sterile chamber is thus achieved.

In a further advantageous embodiment a blow mould carrier part is arranged in a stationary manner with respect to the carrier. The number of necessary bearing elements can thus be reduced.

The fastening element in which the feed line is arranged is advantageously arranged movably with respect to the carrier, for example in the form of the pivoting shaft.

In a further advantageous embodiment at least one blow mold carrier part with the respective blow mold part or at least one blow mold part itself is at least in a rotationally fixed manner or preferably rigidly connected with at least one fastening element. In this case rigidly connected can be understood, that, for example, a material closure (such as welding), a frictional connection (such as fits, clamping) or a form closure (such as bolting, riveting) consists or that the blow mold carrier part and the fastening element consist of one single part. Thus during any movement the blow mold carrier part moves with the fastening element at which it is arranged. Preferably both blow mold carrier parts are arranged at its corresponding fastening elements.

In a further advantageous embodiment bearings for supporting the fastening element are arranged outside the clean chamber.

At least one sealing device is also advantageously provided so as to seal the feed line with respect to the clean chamber, and at least one sealing device is more preferably provided so as to seal said movable fastening element with respect to the carrier.

BRIEF DESCRIPTION OF THE DRAWINGS

Further advantages and embodiments will emerge from the accompanying drawings.

In the drawings:

FIG. 1 shows a schematic illustration of an installation for producing plastics material containers;

FIG. 2 shows a view of a clean chamber in the region of a shaping station;

FIG. 5 shows a detailed illustration of the shaping station shown in FIG. 4;

FIG. 6 shows an illustration of a blow mould according to the invention;

FIG. 7 shows a further illustration of a shaping station according to the invention;

FIG. 8 shows an illustration of a blow mould arranged on a blow mould carrier;

DETAILED DESCRIPTION OF THE INVENTION

Figure 3:
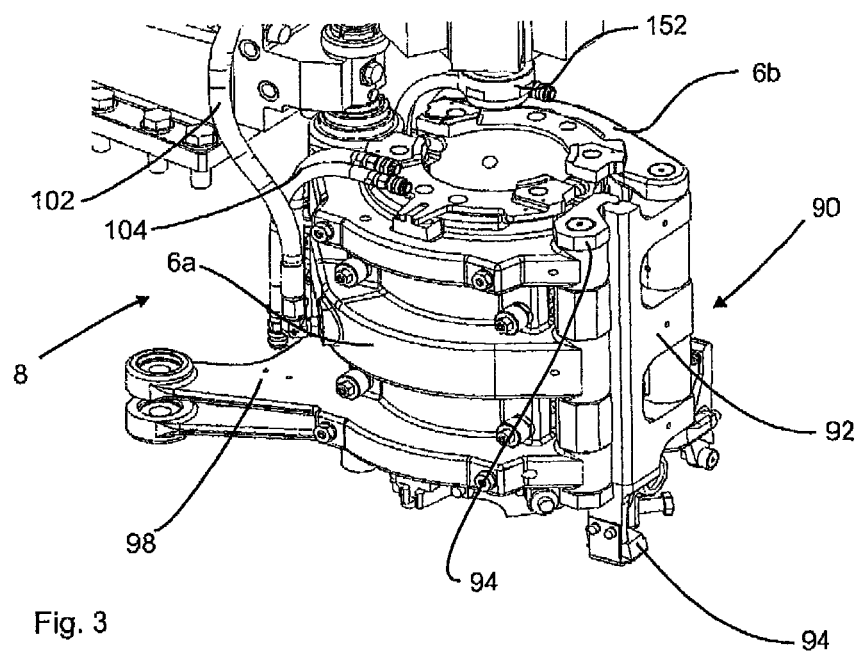
FIG. 3 shows shaping station according to the prior art.

FIG. 1 shows a schematic illustration of an installation for producing plastics material containers. This installation 50 comprises a heating device 30 in which plastics material preforms 10 are heated. These plastics material preforms 10 are guided through this heating device 30 by means of a transport device 34, such as a peripheral chain in this case, and are heated by a multiplicity of heating elements 31. A transfer device 36 connects to this heating device 30 and transfers the preforms 10 to a sterilisation device 32. This sterilisation device 32 likewise comprises a transport wheel 37 in this case and sterilisation elements can be arranged on this transport wheel 37 or in a stationary manner. For example, sterilisation is possible in this region by hydrogen peroxide gas or by electromagnetic radiation. In particular, inner sterilisation of the preforms is carried out in this region.

In its entirety, reference sign 20 denotes a clean chamber, of which the outer delimitations are indicated by the dotted line L. It can be seen that this clean chamber 20 starts in the region of the sterilisation unit 32. Lock devices may be provided in this region so as to introduce the plastics material performs into the clean chamber 20 without too much gas inside the clean chamber being lost.

As indicated by the dashed line L, the clean chamber is adapted to the outer shape of the individual installation components. The volume of the clean chamber can thus be reduced.

In its entirety, reference sign 1 denotes a shaping apparatus, in which a multiplicity of blow moudling stations or shaping stations 8 are arranged on a transport wheel 2, wherein merely one of these blow moulding stations 8 is illustrated in this case. The plastics material preforms 10 are expanded by these blow moulding stations 8 to form containers 10a. Although not shown in detail in this case, the transport device 2 is not located entirely in the clean chamber 20, but instead the clean chamber 20 or isolator is formed, to a certain extent, as a mini-isolator inside the entire apparatus. It would thus be possible for the clean chamber to be designed in a duct-like manner, at least in the region of the shaping apparatus 1.

Reference sign 22 relates to a feeding device which transfers the preforms to the shaping apparatus 1, and reference sign 24 relates to a discharging device which removes the produced plastics material containers 20 from the shaping apparatus 1.

It can be seen that the clean chamber 20 comprises recesses in the region of each of the feeding device 22 and of the discharging device 24, said recesses receiving these devices 22, 24. In this way, it is possible for the plastics material preforms 10 to be transferred to the shaping apparatus 1, and for the plastics material containers 10a to be transferred from the shaping apparatus 1 in a particularly advantageous manner.

The expanded plastics material containers are transferred to a filling device 40 by a transfer unit 42, and are then removed from this filling device 40 by a further transport unit 44. The filling device 40 is also located inside said clean chamber 20. In the case of the filling device, too, it would be possible that the entire filling device 40 with a reservoir for a beverage for example is not arranged completely inside the clean chamber 20, but in this case, too, merely those regions in which the containers are actually guided. In this regard, the filling device could also be constructed in a similar manner to the apparatus 1 for shaping plastics material preforms 10.

As mentioned, the clean chamber 20 is reduced, in the region of the apparatus 1, to a minimal region, that is to say basically to the blow moulding stations 8 themselves. Owing to this compact design of the clean chamber 20, it is possible to produce a clean chamber generally in a simpler and quicker manner, and it is also less costly to maintain the sterile conditions during the operating phase. Less sterile air is also required, which leads to smaller filtering systems and also reduces the risk of uncontrolled vortex formation.

FIG. 2 shows a detailed illustration of the apparatus 1 in the region of a blow moulding station 8. A multiplicity of such blow moulding stations 8 are rotated by a transport device 2 or a carrier about an axis X. The blow moulding station 8, as is evident in FIG. 2, is guided inside the clean chamber 20, which is formed in a duct-like manner in this case. This clean chamber 20 is closed by a movable side wall 19 and a cover 17 formed in one piece with this side wall 19. This side wall 19 and the cover 17 rotate together with the blow moulding station 8.

Reference sign 18 relates to a further wall, which defines the clean chamber 20. This wall 18 is an outer wall in this case, which is arranged in a stationary manner. A sealing device 25 is provided between the cover 17 and the wall 18, and seals the elements 17 and 18, which are movable in relation to one another, with respect to one another, for example using a surge tank, as mentioned above. The lower region of the wall 18 is arranged rigidly and sealingly on a base 13. A carrier 26 is provided inside the clean chamber 20, in this case directly against the wall 19, and is likewise rotated, a holding device 23 which holds the blow moulding station 8 in turn being provided on said carrier.

Reference sign 11 relates to a downstream device which can be actuated by a guide cam 9 so as to open and close the blow moulding station on its path through the clean chamber 6, in particular so as to insert the plastics material preform in the blow moulding station and also so as to remove it again. A guide cam 9 is also arranged inside the clean chamber 20. However, it would also be possible for example to already lead a portion 11 beneath the individual blow moulding stations 8 out from the clean chamber 20.

The transport device 2 may also comprise further elements which are arranged above the clean chamber 20.

The carrier 26 is arranged rigidly on a holding member 29 and this holding member is in turn movable with respect to the base 13. Reference sign 27 relates to a further sealing device which, in this region too, provides a seal of the regions 13 and 29 which are movable in relation to one another.

Reference sign 5 relates to a stretching rod which is movable with respect to the blow moulding station so as to stretch the plastics material preforms 10 in their longitudinal direction. A slide 12 is in this case arranged on the cover 17, the stretching rod being movable in relation to said slide 12 in the direction Y. Reference sign 21 relates to a further support for this slide 12 of the stretching rod 5.

It can be seen that certain regions of the stretching rod are both outside the clean chamber 20 and inside the clean chamber 20 during the blow moulding procedure. For this purpose, it is possible to provide a protection device, such as a bellows, which surrounds the stretching rod 5, outside the clean chamber 20 or above the slide 12 so that no region of the stretching rod 5 comes into direct contact with the outside environment. Reference sign U denotes the (unsterile) surrounding environment of the clean chamber 20. Reference sign 28 denotes a carrier for carrying a base mould, which likewise forms a component of the blow mould. This carrier is likewise movable in the direction Y.

Reference sign 55 relates to a sterilisation device which, in this case, is preferably arranged inside the clean chamber 20 and is used to sterilise the individual shaping stations and components of these shaping stations 8. This sterilisation device 55 can apply hydrogen peroxide for example or another sterilisation means to the shaping stations 8. The sterilisation device 55 can be arranged in a stationary manner, and the shaping stations can move in relation to this sterilisation device 55.

The blow moulds (not shown) are arranged inside the blow mould carrier 6. More specifically, two blow mould carrier parts may be arranged which are pivotable with respect to one another and each hold a blow mould part. As a result of this pivoting procedure, the blow moulds can be opened for insertion of plastics material preforms and for removal of finished, blown containers. These blow mould carriers and blow moulds are likewise arranged inside the clean chamber.

FIG. 3 shows a shaping station 8 according to the prior art. This shaping station comprises two blow mould carrier parts 6a and 6b, which are pivotable with respect to one another so as to open and close the blow mould (not shown). Reference sign 98 denotes a lever, which can be linked via a linkage (not shown) so as to thus move the blow mould carrier part.

In its entirety, reference sign 90 denotes a locking mechanism which is used to lock the two blow mould carrier parts 6a and 6b in a closed state of the blow mould. To this end, a pivotable locking element 92 engages in a second locking element 94, which is arranged in a stationary manner in this case, and thus locks the two blow mould carrier parts 6a and 6b in relation to one another.

Reference sign 152 denotes an application device, such as a blowing nozzle, which applies pressurised air to the plastics material preform (not shown) arranged inside the blow mould for the expansion of said plastics material preform. Reference signs 102 and 104 denote hoses which are used for media guidance. These hoses pose a high contamination risk.

Figure 4:
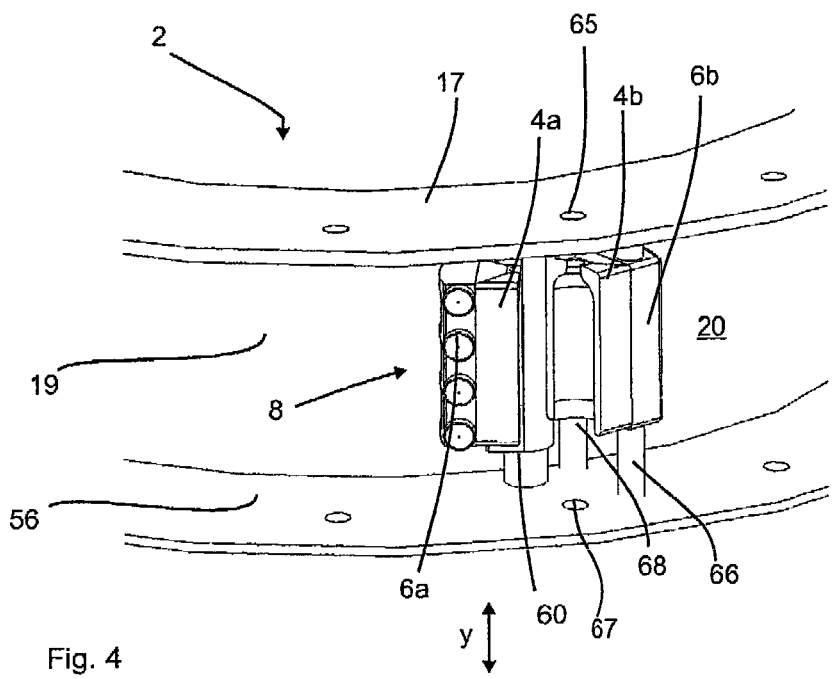
FIG. 4 shows a schematic illustration of a shaping station according to the invention.
Figure 9:
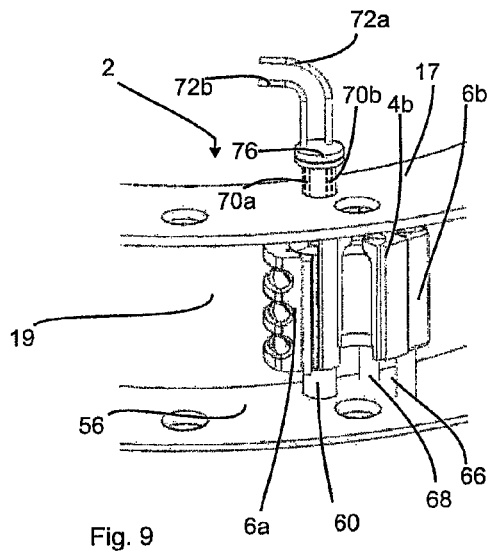
FIG. 9 shows an illustration of a further embodiment of an apparatus according to the invention.

FIG. 4 shows a first embodiment of an apparatus according to the invention. More specifically, a shaping station 8 is shown, which is arranged on a carrier or blow moulding wheel 2. The walls 17, 19 and 56 are walls likewise defining the clean chamber 20 (inside which the shaping stations 8 are moved). These walls thus simultaneously form the boundaries of the clean chamber or sterile chamber in this case.

In the embodiment shown in FIG. 4 the blow mould carrier 6b on the right and the blow mould part 4b arranged therein are arranged in a stationary manner via two carriers 66 and 68. The blow mould carrier 6a on the left with the blow mould 4a is pivotable via a pivoting shaft 60 so as to open and close the blow mould. Reference signs 65 and 67 relate to openings which are arranged in the carrier or in the regions 17 and 56 of the carrier. For example, a stretching rod can be introduced via the opening 67. This base mould carrier may also be movable in the direction Y to open and close the blow mould. Corresponding guide cams, which carry out the individual movements, are advantageously arranged outside said clean chamber 20.

FIG. 5 shows a further embodiment of an apparatus according to the invention. In this case in particular a feed line 70 can also be seen, which is guided inside the carrier 66 in this case. This feed line for the free-flowing medium could accordingly also be guided in the carrier 68 or in the pivoting shaft. For example, a pressure pad (not shown in FIG. 5) can be controlled via this feed line.

FIG. 6 again shows the two blow mould parts 4a and 4b, which are each arranged on blow mould carrier parts 6a and 6b, wherein, as mentioned above, the blow mould carrier part 6b is stationary and the blow mould carrier part 6a is moved with respect thereto by means of a pivoting shaft 60. This pivoting shaft is advantageously arranged pivotably on the carrier 2, as mentioned above. In this case reference sign 70 again denotes possible arrangements for the feed lines, which may be arranged either in the pivoting shaft 60 and/or in one of the carriers 66 or 68 for example. It would also be possible for more feed and/or discharge lines to be formed in the pivoting shaft 60 and/or the carriers 66 or 68.

FIG. 7 shows a further embodiment of the apparatus according to the invention. As mentioned, the media can be fed to the blow moulds or blow mould carriers via the fastening elements, which are the shafts 60, 66 and 68 in this case. Both the fixed carriers or shafts 66, 68 and the pivotable shaft 60 can be used. However, other embodiments are also conceivable, for example with two blow mould carriers mounted movably via pivoting shafts. If the media, as described above, are brought to the mould carriers 6a, 6b, the design is formed under the best possible hygiene conditions in this regard. More specifically, no machine elements such as hoses, pipes, couplings or screwed connections are located inside the clean chamber.

In addition, the above-mentioned media guidance paths can also be used to remove media. For example, this may be cooling media. Furthermore, a deaeration duct for the operating medium of the pressure pad (this generally being air) may also be necessary for example. In addition, a leakage duct may also be provided which deaerates the sealed surrounding chamber of the pressure pad seal (which is preferably designed as a depressurised space) to the surrounding environment. It can thus be ensured that, in the event of a defect of the pressure pad seal, no contaminated working air is pressed into the clean chamber by this additional seal.

FIG. 8 shows this circumstance. A blow mould 4 is arranged on a blow mould carrier 6 via a carrier shell 16. An air chamber or pressure pad 84 is formed in a space between the blow mould carrier and the carrier shell 16. Reference sign 82 relates to a seal for this pressure pad, said seal in this case being arranged completely peripherally around said pressure pad 84. In addition, a further sealing device 86 is also provided outside the sealing device 82. Should unsterile medium nevertheless reach beyond the sealing device 82 from the pressure pad 84, it does not yet reach the clean chamber 20, but merely the space 88 between the sealing device 82 and the sealing device 86. This space is preferably designed so as to be depressurised so that this unsterile medium can be removed from the clean chamber via a discharge line (not shown).

FIGS. 9 to 12 show different approaches for removing or feeding the free-flowing media. In the embodiment shown in FIG. 9 two feed and discharge lines 70a and 70b extend (inside the pivoting shaft 60) from the clean chamber 20. Reference sign 76 denotes a rotary distributor, which is arranged outside the clean chamber 20 and allows the respective free-flowing media to be forwarded to a reservoir (not shown) for example. It should be taken into account that the shaft 60 for opening and closing the blow mould pivots to and fro during working operation, and that, on the other hand, the two lines 72a and 72b are rigid, for example are provided with a piping. Media can thus also be fed in the oscillating shaft 60.

Figure 10:
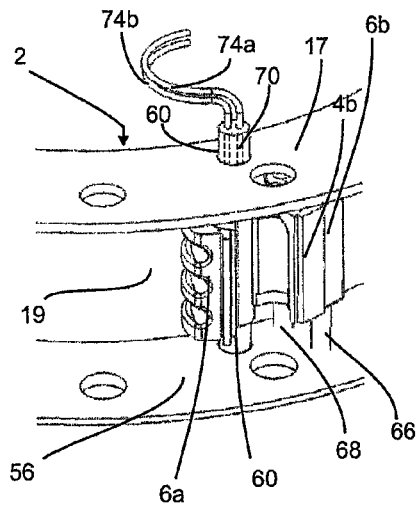
FIG. 10 shows an illustration of a further embodiment of an apparatus according to the invention.

FIG. 10 shows a further possible embodiment, in which there is likewise a compensation of the movement of an oscillating shaft 60. In this case, flexible hose connections 74a and 74b are provided, which take up the pivoting movement. These flexible portions are advantageously also arranged outside the sterile chamber 20.

Figure 11:
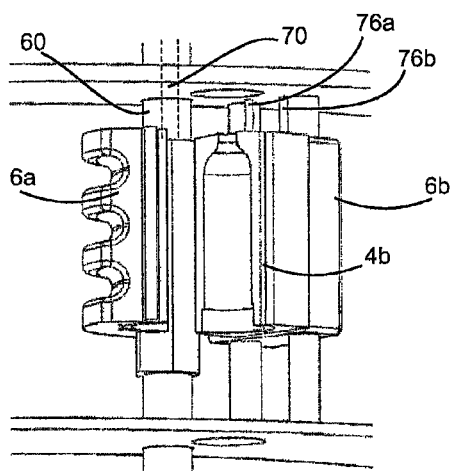
FIG. 11 shows a further view of the apparatus shown in FIGS. 9 and 10.
Figure 12:
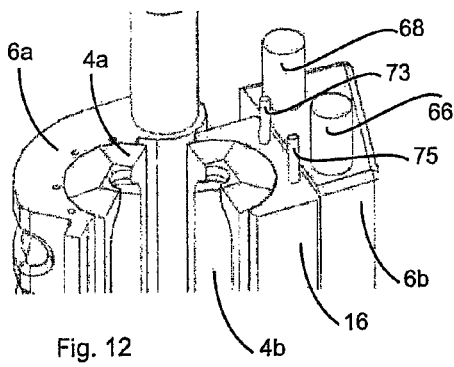
FIG. 12 shows a partial illustration of the shaping stations shown in FIGS. 9 to 10.

FIGS. 11 and 12 show two further approaches for this media feed. In this case, flexible hose system portions 76a and 76b are provided, which open directly into a carrier shell 16 (for example to subject the pressure pad to an application). These carrier shells 16 are also used as a support for the blow mould 4a.

The media can thus also be fed to moved components inside the clean chamber via flexible hoses. In the example shown in Fig. the mould carrier 6b is fastened fixedly on the blow moulding wheel 2. The mould carrier shell 16 is moved by the pressure pad, which is located between the mould carrier shell 16 and the mould carrier 6b. For this reason, the media is advantageously supplied to this mould carrier shell 16 via flexible hoses. These hoses 73 and 75 are advantageously formed perfectly hygienically, that is to say the outer face is formed so as to be as smooth as possible and, in particular, without grooves or texture. This principle of media supply can also be applied for other components in the isolator, such as the blow mould carrier. In this case, the mould carrier shell constitutes a fastening element which is used to fasten the blow mould with respect to the carrier 2 (via the blow mould carrier 6a). However, (in contrast to that shown in FIG. 12), the respective element of the shaping station, such as the blow mould carrier, is preferably arranged directly on the carrier 2 by the fastening element.

Figure 13:
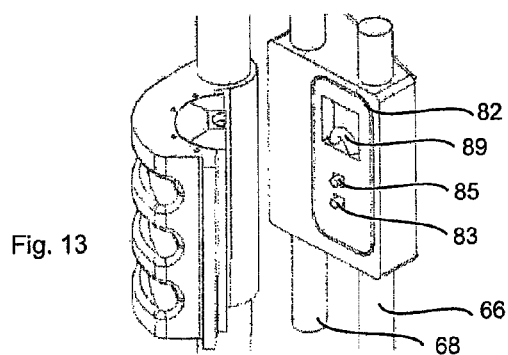
FIG. 13 shows an illustration showing a pressure pad.

FIG. 13 shows an embodiment of the media supply for a pressure pad. Again, the blow mould carrier part 6b is shown, on which the sealing device 82 shown in FIG. 8 is formed. Reference signs 83 and 85 relate to sliding sleeves or sliding hoses, which transport media to the moved mould carrier shell (not shown). Instead of hoses in the clean chamber, a design is thus used in which components for media transport are placed in the region of the pressure pad 84. The advantage of this solution is that all components required for media transfer are formed, in this case, inside the peripheral sealing device (and therefore actually outside the clean chamber), namely in the blow mould carrier 6b. The media can be further transported from here, in particular via the fastening elements, as shown in the figures shown above. A closed chamber is therefore advantageously sealed inside the clean chamber in such a way that it can also be subjected to application of an unsterile medium. The media is preferably supplied to a mould carrier shell placed on a pressure pad by one or more sliding sleeves. In addition however, the media may also be supplied via one or more flexible hose elements in the region of the pressure pad. Reference sign 89 accordingly relates to a flexible hose.

In a further advantageous embodiment the media required at the blow mould or blow mould carrier can be fed and, if necessary, removed without having to cross the clean chamber. The media is preferably fed to and/or removed from the mould carriers or blow moulds separately from the clean chamber.

The applicant reserves to right to claim all features disclosed in the application documents as being essential to the invention insofar as they are novel over the prior art, either individually or in combination.

LIST OF REFERENCE SIGNS 1 shaping apparatus
2 carrier, transport device
4 blow mould
4a, b blow mould parts
5 stretching rod
6 blow mould carrier
6a, b blow mould carrier parts
8 blow moulding station, shaping station
9 guide cam
10 plastics material preforms
10a container
11 downstream device
12 slide
13 base
16 carrier shell
17 cover
18 wall
19 side wall, portion
20 clean chamber
22 feeding device
23 holding device
24 discharging device
25 sealing device
26 carrier
27 sealing device
28 carrier (for base mould)
29 holding member
30 heating device
31 heating elements
32 sterilisation device
34 transport device
36 transfer unit
37 transport wheel
40 filling device
42 transfer unit
44 transport unit
50 arrangement
55 sterilisation device
56 wall
60 pivoting shaft (fastening element)
65, 67 openings
66, 68 carrier
70 feed line
70a, b feed and discharge line
72a, b lines
73, 75 flexible hose
74a, b hose connections
76a, b flexible hose system portions
76 rotary distributor
82 seal
83, 85 sliding sleeve
84 pressure pad
86 further sealing device
88 space
89 flexible hose
90 lock
92, 94 locking element
98 lever
102, 104 hoses
152 application device
S clean chamber boundary
U surrounding environment
X axis of rotation
Y direction
L outer delimitation of the clean chamber

The invention claimed is:

1. An apparatus for shaping plastics material preforms into plastics material containers, having a multiplicity of shaping stations, which are arranged on a movable carrier, the shaping stations each comprising blow moulds, inside which the plastics material preforms can be shaped into plastics material containers by application of a free-flowing medium, as well as blow mould carriers for holding these blow moulds, and the blow mould carriers comprising at least two blow moulding carrier parts movable in relation to one another to open and close the blow moulds, and having at least one fastening element, via which at least one element of the shaping stations is arranged on the carrier with a clean chamber which is defined with respect to a surrounding environment (U) using at least one wall and which surrounds the individual shaping stations, at least in part, so that the shaping stations are movable inside the clean chamber, and having at least one feed line, which feeds a free-flowing medium at least to one shaping station arranged in the clean chamber for operation of said shaping station, the feed line for the free-flowing medium extending through a boundary (S) of the clean chamber 20, wherein the feed line is guided, at least over portions, through the fastening element, or the feed line is guided, at least over portions, inside an tubular member arranged in the clean chamber, and wherein the fastening element is mounted movably with respect to the carrier.

2. The apparatus according to claim 1, wherein
the fastening element is a pivoting shaft, in relation to which the blow mould carrier parts are movable in relation to one another.

3. The apparatus according to claim 1, wherein
the feed line comprises at least one flexible portion.

4. The apparatus according to claim 3, wherein
the flexible portion is arranged completely inside the clean chamber or completely outside the clean chamber.

5. The apparatus according to claim 1, wherein
at least one feed line is connected in terms of flow to at least one blow mould or to at least one blow mould carrier.

6. The apparatus according to claim 1, wherein
the apparatus comprises at least one discharge line, which removes a free-flowing medium from the clean chamber.

7. The apparatus according to claim 1, wherein
at least one fastening element comprises a duct for conveying the medium.

8. The apparatus according to claim 1, wherein
the feed line extends through a wall formed by the carrier.

9. The apparatus according to claim 1, wherein
a blow mould carrier part is arranged in a stationary manner with respect to the carrier.

10. The apparatus according to claim 1, wherein
at least one blow mold carrier part is connected with at least one fastening element.

11. The apparatus according to claim 1, wherein
the movable carrier comprises a c-shaped profile at its outer periphery and an upper branch of the c-shaped profile as well as a lower branch constitute walls of the clean chamber.

12. The apparatus according to claim 1, wherein bearings for supporting the fastening element are arranged outside the clean chamber.

13. The apparatus according to claim 2, wherein one blow moulding carrier part is pivotable via the pivoting shaft to open and close the blow mould, and the other blow moulding carrier part is arranged in a stationary manner via two carriers.

14. The apparatus according to claim 1, wherein at least one of the blow moulds is arranged on the respective blow mould carrier via a carrier shell and an air chamber or pressure pad is formed in a space between the blow mould carrier and the carrier shell, and wherein a seal for the pressure pad is arranged completely peripherally around the pressure pad.

15. The apparatus according to claim 14, wherein a further sealing device is provided outside the seal and a space is arranged between the seal and the further sealing device, so that unsterile medium, which reaches beyond the seal from the pressure pad, only reaches the space.

16. The apparatus according to claim 15, wherein the space is depressurized so that unsterile medium can be removed from the clean chamber via a discharge line.

17. The apparatus according to claim 1, wherein a rotary distributor is arranged outside the clean chamber and allows the media to be forwarded to a reservoir.

18. The apparatus according to claim 1, wherein flexible hose connections are provided, which take up the pivoting movement and which are arranged outside the clean chamber.

19. An apparatus for shaping plastics material preforms into plastics material containers, having a multiplicity of shaping stations, which are arranged on a movable carrier, the shaping stations each comprising blow moulds, inside which the plastics material preforms can be shaped into plastics material containers by application of a free-flowing medium, as well as blow mould carriers for holding these blow moulds, and the blow mould carriers comprise at least two blow moulding carrier parts movable in relation to one another to open and close the blow moulds, and having at least one fastening element, via which at least one element of the shaping stations is arranged on the carrier with a clean chamber which is defined with respect to a surrounding environment (U) by at least one wall, and which surrounds the individual shaping stations, at least in part, so that the shaping stations are movable inside the clean chamber, and having at least one feed line, which feeds a free-flowing medium at least to one shaping station arranged in the clean chamber for operation of said shaping station, the feed line for the free-flowing medium extending through a boundary (S) of the clean chamber, wherein the feed line is guided, at least over portions, through the fastening element, or the feed line is guided, at least over portions, inside an tubular member arranged in the clean chamber and wherein at least one blow moulding carrier part is at least in a rotationally fixed manner connected with at least one fastening element.

* * * * *